(12) United States Patent
Ghodake et al.

(10) Patent No.: US 11,226,871 B2
(45) Date of Patent: Jan. 18, 2022

(54) EFFICIENT TARGETED FILE-LEVEL RESTORE FROM CLOUD SNAPSHOTS

(71) Applicant: EMC IP Holding Company, LLC, Hopkinton, MA (US)

(72) Inventors: Ganesh Ghodake, Pune (IN); Sachin Patil, Pune (IN)

(73) Assignee: EMC IP Holding Company, LLC, Hopkinton, MA (US)

( * ) Notice: Subject to any disclaimer, the term of this patent is extended or adjusted under 35 U.S.C. 154(b) by 111 days.

(21) Appl. No.: 16/445,941

(22) Filed: Jun. 19, 2019

(65) Prior Publication Data

US 2020/0401487 A1 Dec. 24, 2020

(51) Int. Cl.
*G06F 11/14* (2006.01)
*G06F 16/11* (2019.01)
*G06F 16/22* (2019.01)

(52) U.S. Cl.
CPC ...... *G06F 11/1469* (2013.01); *G06F 11/1451* (2013.01); *G06F 11/1464* (2013.01); *G06F 16/128* (2019.01); *G06F 16/2237* (2019.01); *G06F 2201/84* (2013.01)

(58) Field of Classification Search
None
See application file for complete search history.

(56) References Cited

U.S. PATENT DOCUMENTS

| | | | |
|---|---|---|---|
| 9,772,916 B2 * | 9/2017 | Rangasamy | G06F 11/00 |
| 10,474,542 B2 * | 11/2019 | Mitkar | G06F 3/0656 |
| 10,509,573 B2 * | 12/2019 | Dornemann | G06F 3/0619 |
| 2015/0363282 A1 * | 12/2015 | Rangasamy | G06F 11/1451 714/4.12 |
| 2018/0275913 A1 * | 9/2018 | Mitkar | G06F 11/1469 |
| 2020/0349024 A1 * | 11/2020 | Bhagi | G06F 11/1469 |

* cited by examiner

*Primary Examiner* — Farhan M Syed
(74) *Attorney, Agent, or Firm* — Barry N. Young

(57) ABSTRACT

Files are identified for file-level restore by bitmaps of cloud snapshots of a storage volume. The bitmaps comprise a data structure for each snapshot containing record numbers of files of the storage volume and a file status bit for each such file that indicates the presence or absence of the file in the corresponding snapshot. File numbers of files of interest are obtained from record numbers of records in a volume files index of the storage volume. The bitmaps can be searched to locate the snapshots containing particular files of interest without the necessity of mounting and searching the separate snapshots on a virtual machine.

19 Claims, 6 Drawing Sheets

EFFICIENT TARGETED FILE-LEVEL RESTORE FROM CLOUD SNAPSHOTS

BACKGROUND

This invention relates generally to methods and systems for the recovery of data files and/or folders from cloud backup storage, and more particularly to the recovery of individual files and folders from file-level restore snapshots in cloud backup storage.

Cloud computing has become a popular way of delivering hosted services over the Internet. These services include Infrastructure-as-a Service (IaaS) in which the cloud provider hosts the infrastructure components traditionally present in an on-premises data center such as servers, storage and networking hardware, as well as the virtualization services. Public cloud computing is particularly attractive to businesses and end-users since it affords self-service provisioning where users can activate virtual computing resources on-demand and pay for only the resources they use. The main resources provided by a cloud are virtual machines and storage volumes, which is particularly advantageous to big data which requires large amounts of computing resources and backup storage.

There are times when a user wishes to restore (recover) a file or a folder that was previously backed up and which may have been deleted. File-Level Restore ("FLR") provides a way of accessing individual files within restore points for virtual machines. It provides a mechanism to read copies of files or to restore them from within restore points to another available location. Restore points comprise snapshots of virtual machine ("VM") data at particular points in time. Thus, a series of snapshots represent changes in a data storage volume over time. There are typically multiple snapshots representing multiple different restore points. It is not possible to read a file from a snapshot directly with a read operation. Rather, the snapshot must be mounted as a volume on a VM to search it for a desired file and to read the file. If the desired file or folder is not on the mounted snapshot, the user may have to mount and perform FLRs on multiple snapshots to locate a desired file. It is burdensome and costly to spawn temporary resources just to mount and search snapshots to locate desired files, and is particularly so if the user has to restore multiple files or folders from multiple numbers of backup snapshots. Furthermore, because of the complexity and restrictiveness of cloud APIs due to security and accessibility requirements, the challenges are multifold and complex.

It is desirable to provide systems and methods that address these and other problems associated with FLR by enabling fast and efficient location of desired files in snapshots without the necessity of having to mount and search multiple snapshots to locate the desired files, and it is top these ends that the invention is directed.

DESCRIPTION OF PREFERRED EMBODIMENTS

The invention is particularly applicable to a public cloud backup storage environment such as afforded by Amazon Web Services ("AWS"), Microsoft Azure and Google GCE, and will be described in that context. As will be appreciated, however, this is illustrative of only one utility of the invention, and the invention may be used advantageously in other contexts and for other applications.

The invention affords an expedited and efficient method and system for searching of multiple snapshots to locate a desired file or group of files, e.g., a folder of files, for FLR without the necessity of mounting the snapshots on a VM. As will be described in more detail, the invention accomplishes this by creating a files index and an initial snapshot bitmap of a storage volume efficiently and securely at the time of creation of a volume snapshot. The files index identifies all objective files that are included in the volume and in the snapshot. To recover one or more desired files, various snapshots can be searched to locate those snapshots containing the desired files and to generate a list of relevant snapshots. The user may then search the list to select the snapshots containing the files of interest, and perform a FLR/restore to recover the desired files.

Because maintaining a file index at a snapshot level is costly of storage resources, and the necessity of having to search multiple snapshot indices significantly slows searches, in accordance with the invention, as will be described in detail, file indices are preferably maintained at a volume level rather than at a snapshot level, and a bitmap may be created for each snapshot to indicate whether a particular file is included in a given snapshot. Using a volume files index of a storage volume and snapshot bitmaps allows a user to quickly locate a snapshot containing a desired file or folder of files without the necessity of mounting and searching multiple snapshots.

Figure 1:
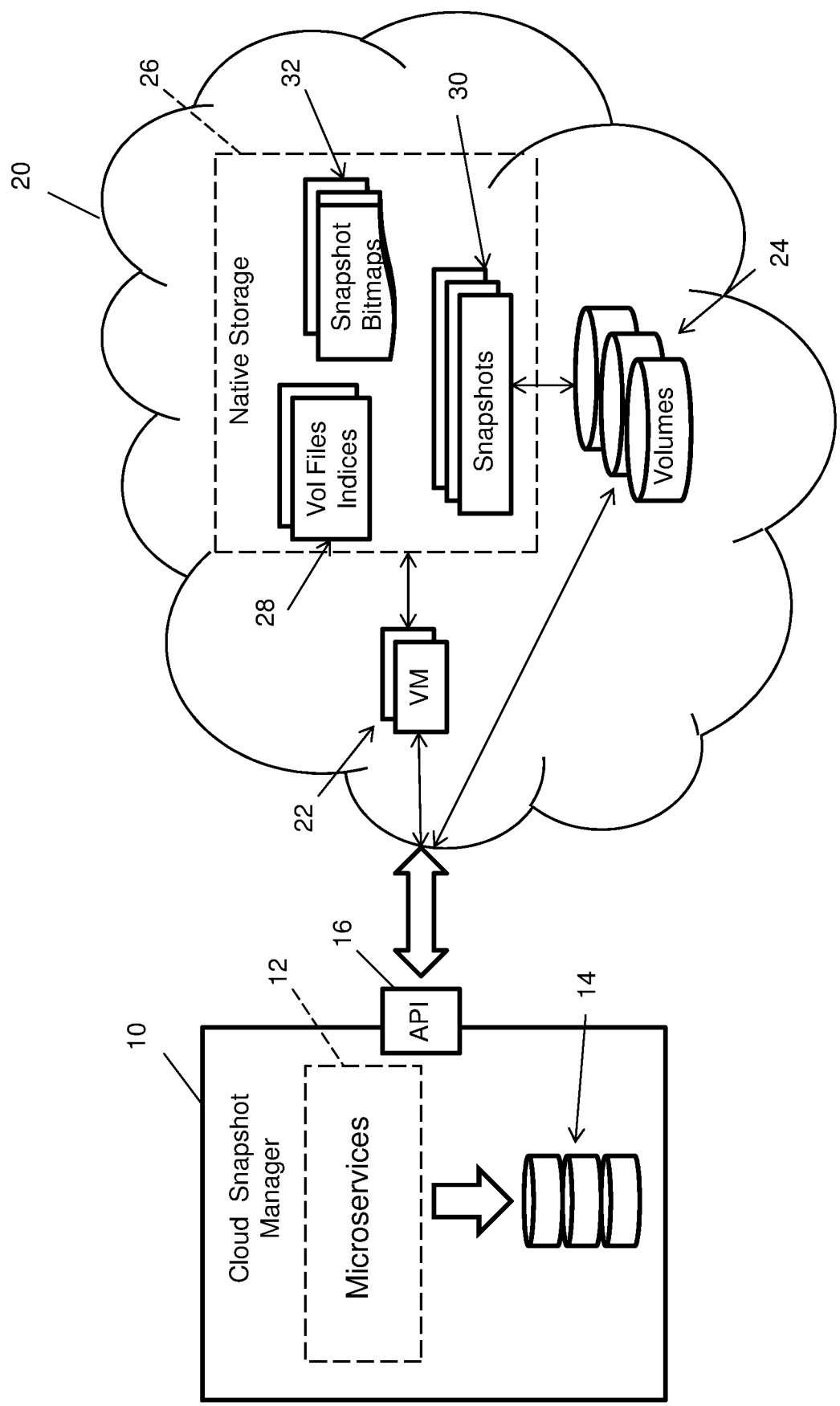
FIG. 1 is a diagrammatic block diagram illustrating a cloud environment comprising an embodiment of a system in accordance with the invention.

FIG. 1 illustrates as a block diagram the architecture of a cloud-based system in accordance with the invention. Referring to the figure, the system may comprise a cloud snapshot manager ("CSM") 10 comprising a SaaS processing system and memory embodying executable instructions for performing various microservices 12 enabling users to discover, manage and automate the protection of workloads across multiple clouds for backup and recovery, including managing the creation, deletion and retention of snapshots, and providing an application framework for restores. The CSM may include storage 14 and APIs 16 for interfacing with various multiple public clouds, such as a cloud 20. In a preferred embodiment, the CSM 10 may comprise a Cloud Snapshot Manager of Dell/EMC, the assignee of this invention.

Cloud 20 shown in FIG. 1 may be one of multiple public cloud environments, such as AWS, for example, managed by CSM 10. Cloud 20 may provide the infrastructure for various virtual machines (VMs) 22 and storage volumes 24, and may include native storage 26 for storing volume files indices 28, snapshots 30 and snapshot bitmaps 32. As will be described, the volume files indices 28 provide a separate volume files index indicating the files stored on each storage volume. The snapshots 30 comprise images of the data states of volumes at particular points in time at which the snapshots are taken. The snapshot bitmaps 32 comprises compact data structures that indicate whether a particular file is present in a given snapshot, and provide a fast search mechanism that allows a user to quickly locate files of interest.

Figure 2:
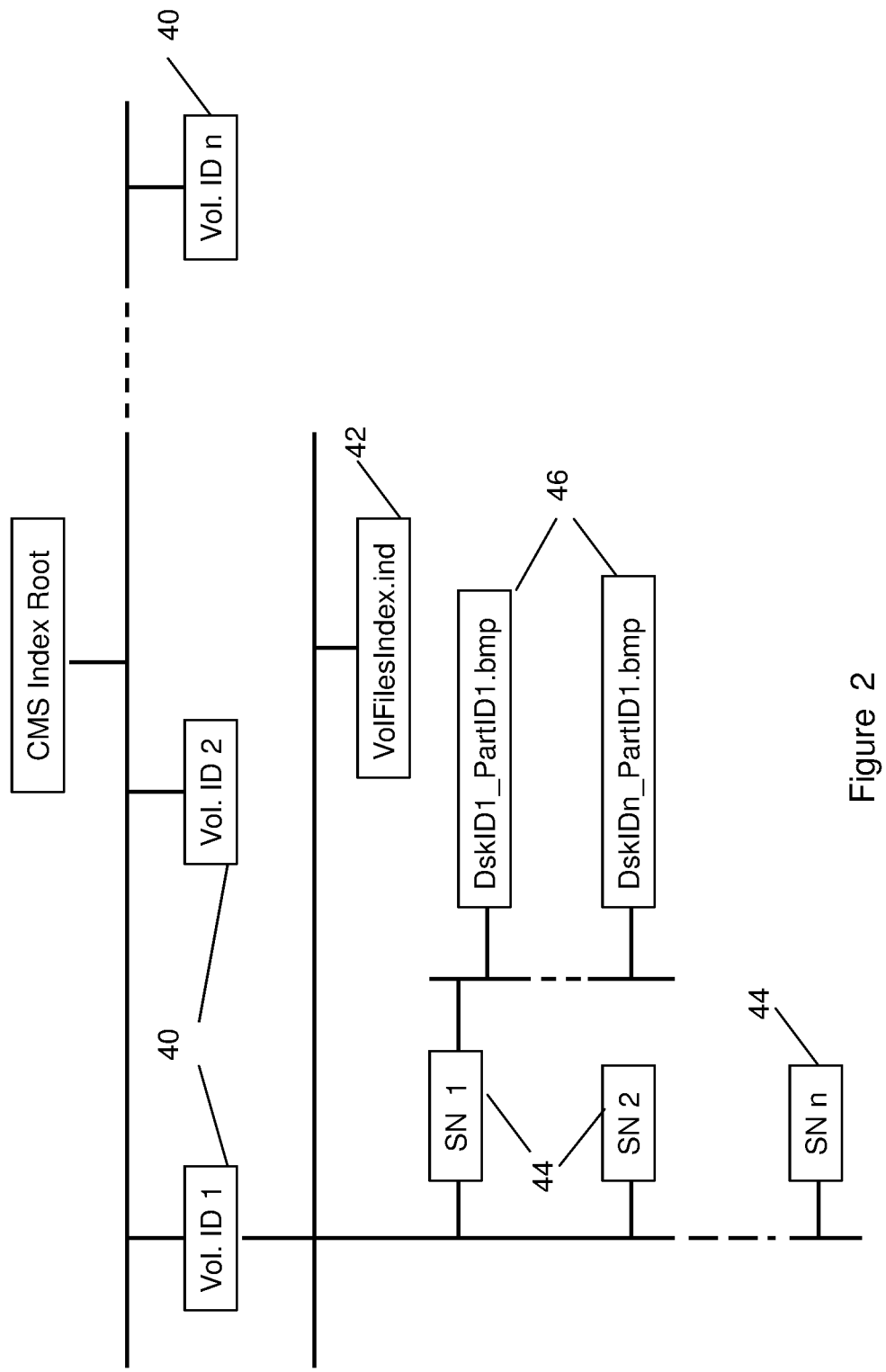
FIG. 2 is a diagrammatic view of the structure of the data storage in the system of FIG. 1.

As mentioned, maintaining a file index for each snapshot would be costly of storage, and searching each of multiple snapshots to locate one or more files of interest would be time-intensive and slow. Accordingly, in accordance with the invention, file indices are maintained at a volume level rather than at a snapshot level. FIG. 2 illustrates the organizational structure of the data in the system of FIG. 1. As shown, in the cloud there may be multiple storage volumes 40 for storing data files, each identified by a corresponding volume identifier, Vol. ID 1. Vol. ID 2, . . . Vol.ID n. Each storage volume may have an associated volume files index (VolFilesIndex.idn), 42, that lists all files in that volume, as shown in and as will be described in connection with FIG. 3. An initial volume files index may be created for a volume when a first snapshot of that volume is taken. Then the initial index is preferably updated for each subsequent snapshot by adding new files to the end of the index. Previously indexed files which have since been deleted from the volume will not be removed from the volume files index, but rather their status will be indicated in the bitmap for the new snapshot, as will be described in connection with FIG. 4. Existing snapshots would be unchanged by the addition or deletion of files. Thus, as will be appreciated, maintaining the volume files indices is very easy and quick.

As shown in FIG. 2, for each volume there will be a series of different snapshots 44, each identified by a snapshot number, i.e., SN1, SN2, . . . SNn, and each representing the data state of the volume at different times. Each snapshot 44 may identify files on different disks and disk partitions by DskID and PartID, 46, of a volume, as shown.

Figure 3:
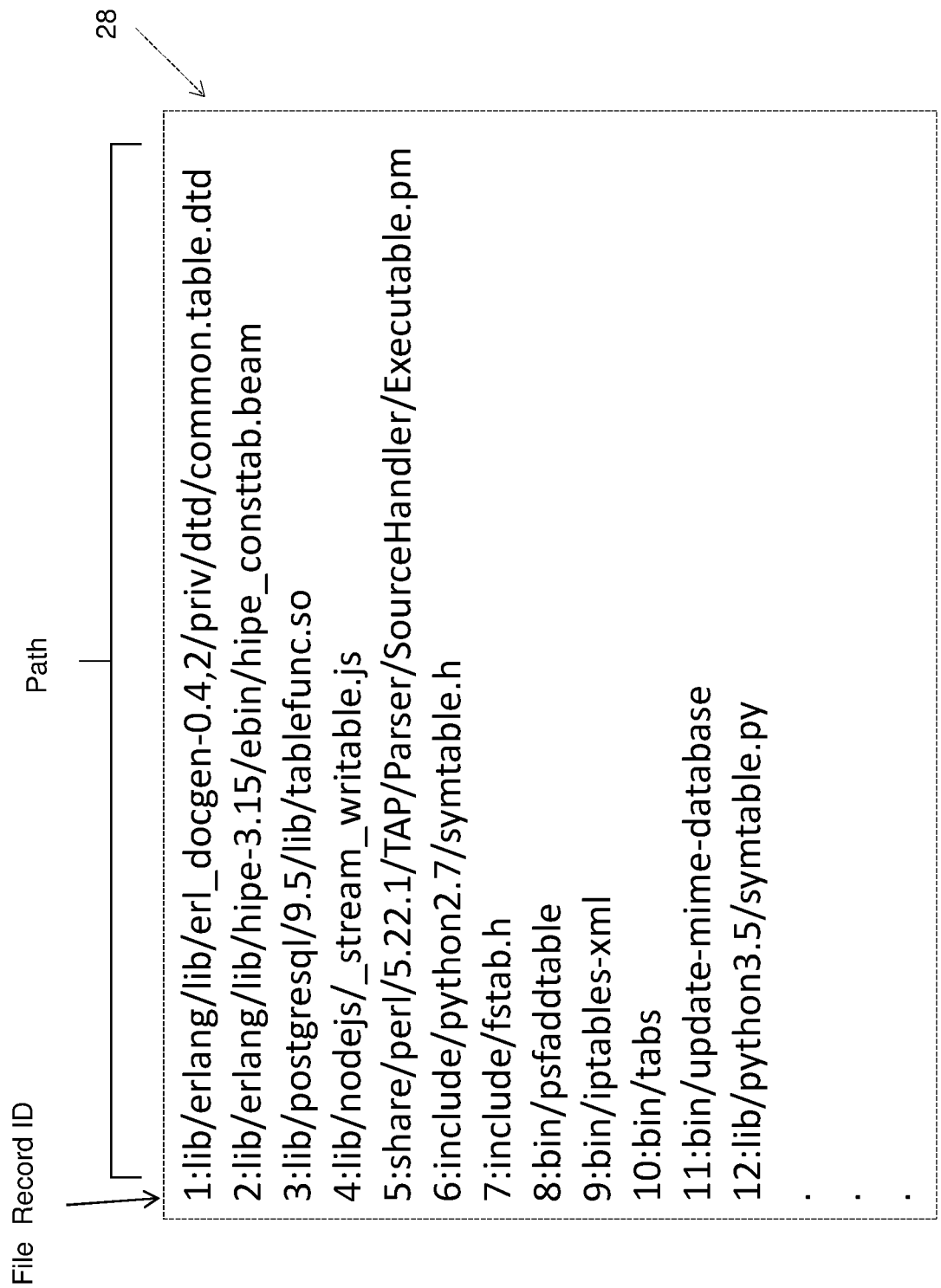
FIG. 3 illustrates an example of an index file of the files/directories present in a storage volume.

FIG. 3 illustrates an example of a volume files index, 28. As shown, the volume files index is simply a list of records identifying the paths of files and their directories that are present in the associated volume. The file/directory path may be stored as an absolute path, in JSON format as a tree structure or in some other way. In FIG. 3, the number at the beginning of each record comprises a record number and an identifying number of the corresponding file. The text string after the colon ":" corresponds to the absolute path of the file/directory. The order of the files is preferably the same in the index for each snapshot. New files are preferably added at the end of the index, but deleted files are preferably not removed.

Figure 4:
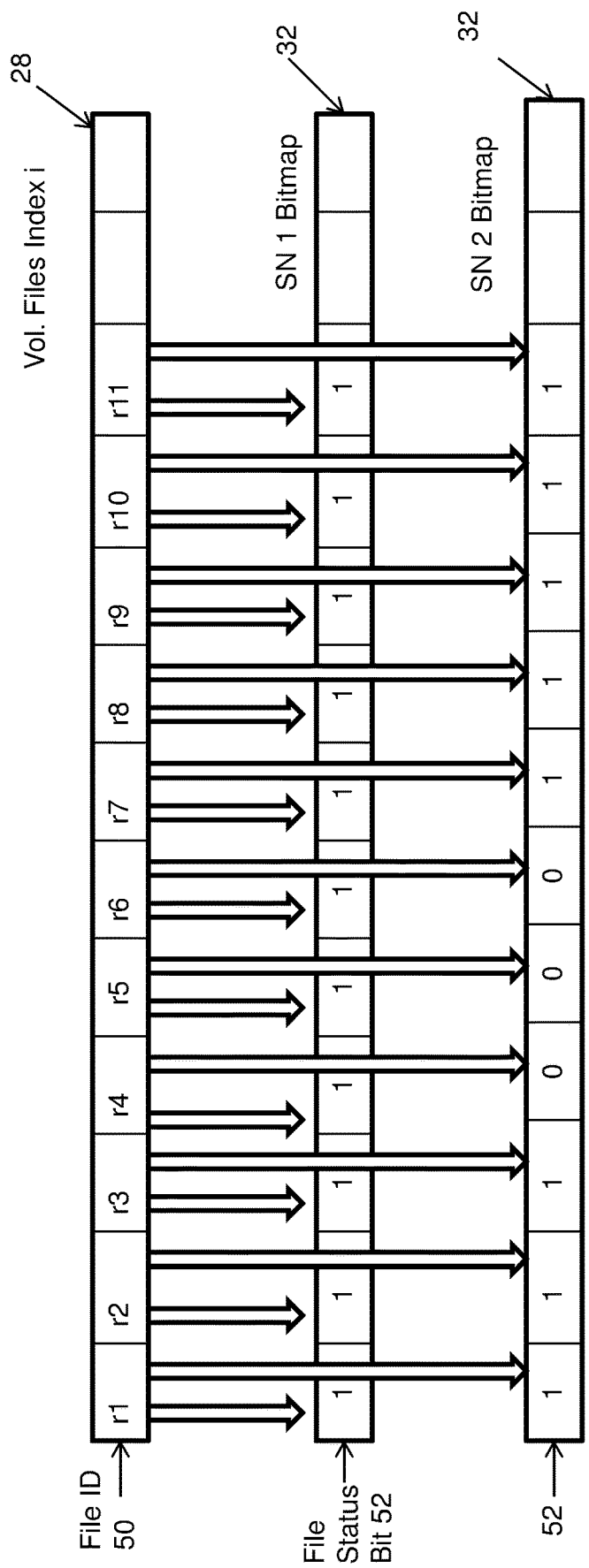
FIG. 4 is a diagrammatic view of an example of a bitmap file representing the volume files in snapshots.

FIG. 4 illustrates an example of a sequence of snapshot bitmaps 32 in accordance with the invention for a sequence of snapshots of a storage volume. As shown, each bitmap comprises a data structure which correlates each file that was or is present in the volume files index "i", as represented by a file ID number 50 which indicates a corresponding record number (r1, r2, r3, . . . ) in the corresponding volume files index "i". Snapshot bitmaps 32 may comprise a sequence of bytes that that are stored in native storage 26 in the cloud. Each snapshot bitmap may have a plurality of file status indicator bits 52, one for each file identified by a file ID 50 in the volume files index. The file status bit is used to indicate the status (present or deleted) in each snapshot of each file listed in the volume files index. The snapshot bitmaps map the changing status of files in the volume over time as each snapshot is created. If the status bit for a file is ON ("1") in a snapshot bitmap, the corresponding file is present in the snapshot. Otherwise, if the status bit is OFF ("0"), the corresponding file in not present in the snapshot, indicating it had likely been deleted or renamed when that snapshot was taken.

Thus, as shown in FIG. 4, since all status bits 52 in snapshot bitmap SN 1 are ON ("1") for all record numbers r1-r11 in volume files index i, all of the files corresponding to these record numbers are present in SN 1. However, as shown in subsequent snapshot SN 2 in FIG. 4, the status bits corresponding to record numbers r4, r5 and r6 are all OFF ("0"), indicating that the corresponding files are not present in SN 2. The snapshot bitmaps may be easily created at the creation of a new snapshot by comparing a volume files index created at the creation of the new snapshot with the previous volume files index, noting the presence or absence of files in the new volume files index, and setting a corresponding file status bit in the new snapshot bitmap. As can be appreciated, the snapshot bitmaps are a fast and easy way of mapping data changes in files, and in affording a convenient and efficient search mechanism for locating desired files or folders of interest without the necessity of mounting and searching multiple snapshots for the desired files or folders.

Figure 5:
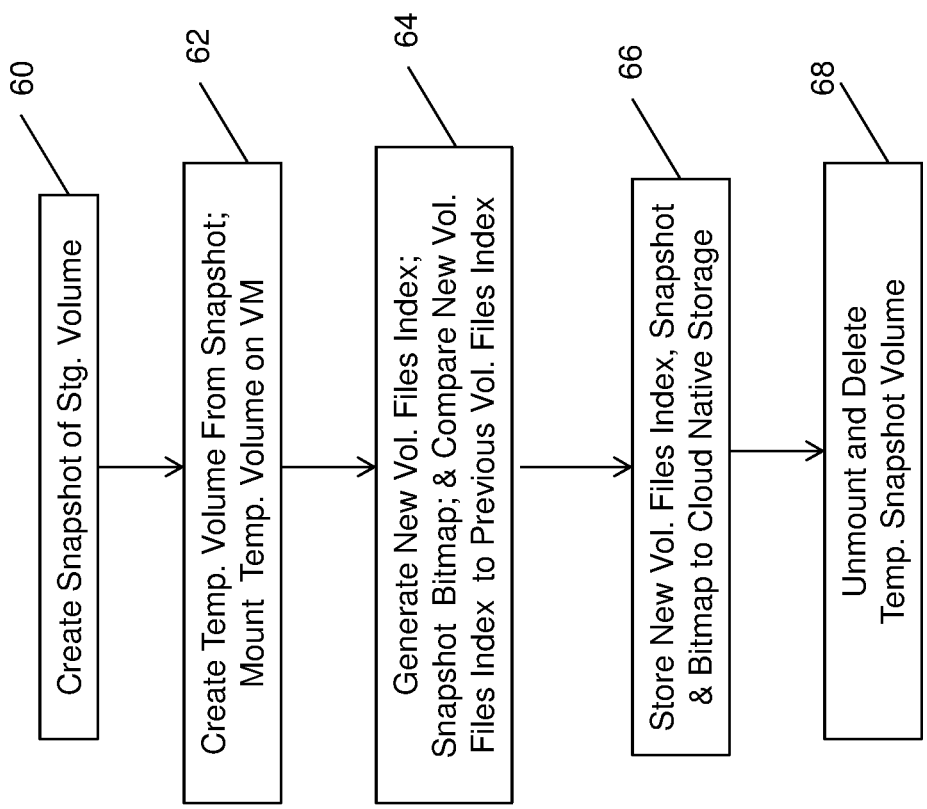
FIG. 5 is a workflow diagram illustrating an embodiment of a backup workflow process in accordance with the invention for creating and managing snapshots in cloud storage.

FIG. 5 illustrates an embodiment in accordance with the invention of a backup workflow process of the CSM 10 for creating and managing volume files indices, snapshots and bitmaps in public cloud 20. The process assumes that there is a dedicated and preconfigured VM in the cloud, and that scripts have been created to create volume files indices and snapshot bitmaps. Snapshot creation and mounting may be performed through the API before calling a script.

Beginning at 60, a snapshot of a particular storage volume may be taken. Once the snapshot is complete and available, at 62 a temporary volume may be created from the snapshot, and the temporary volume may be mounted on a preconfigured VM. At 64, a script, such as an AWS SSM document script, for example, may be called by the CSM to generate a new volume files index and create a snapshot bitmap of a snapshot of the temporary volume. The new volume files index may be compared with a previous volume files index for the volume to determine changes in files, and a new volume files index may be created having the missing and new file record details. A new snapshot for the new volume files index and a new bitmap for the new snapshot may be created with the status bits corresponding to the files in the new index set appropriately OFF or ON to "0" or "1" depending upon whether a file is missing or present. At 66, the new volume files index and a new snapshot bitmap may be stored in native cloud storage. At 68, the temporary snapshot volume may be un-mounted and deleted.

The process of FIG. 5 is a quick, easy and efficient way of creating and maintaining an up-to-date status of the backup files stored in the cloud, and as described in connection with FIG. 6, affords a quick, easy and efficient way of locating files of interest for FLR/restore.

Figure 6:
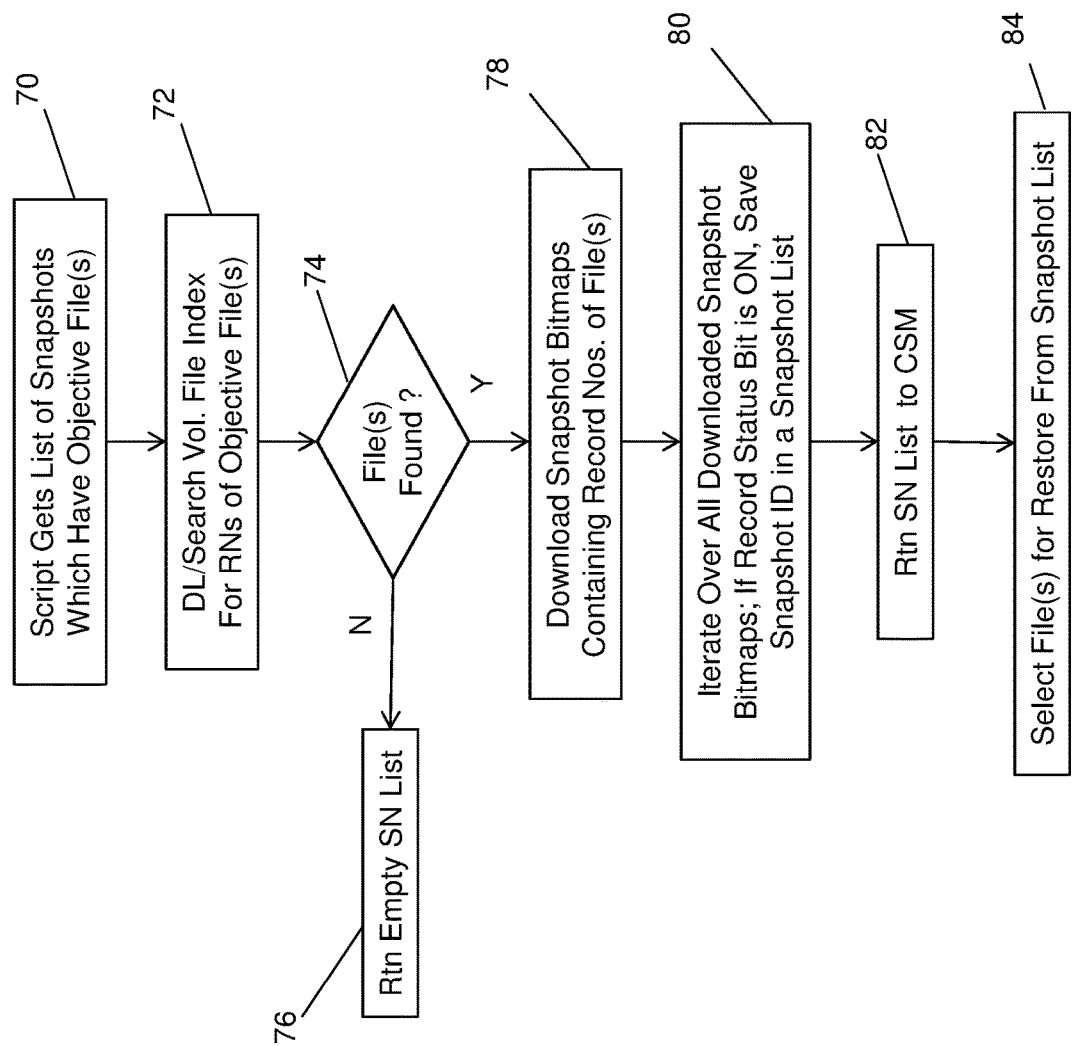
FIG. 6 is a workflow diagram illustrating an embodiment of a process in accordance with the invention for searching for a file for FLR/restore.

FIG. 6 illustrates a framework of a process for searching for one or more desired files for FLR/restore that is efficient and does not require mounting separate individual snapshots of backup volumes on a VM.

Referring to the figure, beginning at 70 the CSM may call a script to obtain a list of snapshots that contain objective files. At 72, an associated volume files index may be downloaded and searched for objective files of interest and to obtain the file record numbers (RNs). If at 74 no files of interest are located, at 76 an empty snapshot list may be returned. Otherwise, at 78, if files of interest are found, snapshot bitmaps containing the relevant file record numbers and the corresponding bitmaps are downloaded. At 80, the downloaded bitmaps may be searched for the record numbers, and the states of the status bits may be determined for the desired files. If the record status bit for a file of interest is ON ("1") in a bitmap, the snapshot ID may be added to a list of relevant snapshots. At 82, the snapshot list may be returned to the CSM, and at 84 files may be selected from the snapshot list for FLR/restore.

Although it is possible to enhance the search efficiency by returning a list of all matched file paths to the user for selection of desired files from the path list, it is advantageous to have the file record numbers for determining file status from the bitmap. It is possible for a volume to have the same filename for files in different directories, and the user may not know the exact directory name or path.

As may be appreciated, the invention affords an efficient, convenient and fast approach to locating desired files of folders of files in backup cloud storage snapshots for FLR/restore without the burden and cost of having to separately mount and search multiple snapshots. As such, the inventive is highly cost effective for enterprise storage and big data operations. Moreover, the inventive approach is applicable to all public and/or private clouds.

Furthermore, while the invention has been described with respect to particular embodiments, it will be appreciated that changes to these embodiments may be made without departing from the principles of the invention, the scope of which is defined by the appended claims.

The invention claimed is:

1. A method of targeted file-level restore of one or more files of interest from snapshots of a storage volume of a processing system in a cloud that stores backup files, comprising:
   creating by said processing system a volume index identifying files in said storage volume;
   taking successive snapshots capturing the files in said storage volume at successive times;
   creating bitmaps for said snapshots, said bitmaps containing record numbers corresponding to file numbers identifying said files in said storage volume, and containing a file status bit for each record number indicating the presence or absence of a corresponding file in each said snapshot;
   determining whether a selected snapshot contains a file of interest for file-level restore based upon said file status bit of said file of interest in a bitmap of said selected snapshot; and
   performing a file-level restore of said file of interest from said selected snapshot.

2. The method of claim 1, wherein said creating said bitmaps comprises creating for each snapshot a data structure containing said record number and said file status bit for each file in said each snapshot, said file status bit indicating the presence or absence of said each file in said each snapshot.

3. The method of claim 2, wherein said creating said bitmaps comprises updating the status of said each file in each successive snapshot by updating the file status bit for each said file in said bitmaps.

4. The method of claim 3, wherein said creating bitmaps comprises creating a file index for each snapshot, and said determining comprises comparing the file index with a volume files index of said storage volume, creating, based upon said comparing, a new snapshot file index with missing and new file record details, and creating said bitmap for said each snapshot using the new snapshot file index.

5. The method of claim 1 further comprising storing said snapshots and said bitmaps in cloud storage.

6. The method of claim 1 further comprising generating an initial volume files index of said storage volume comprising a list of files and a path of each file in said storage volume, and updating said list at said successive snapshots by appending new files to an end of said list.

7. The method of claim 6 further comprising obtaining file numbers of files in said storage volume from said list, and wherein said creating said bitmaps comprises identifying record numbers in said bitmaps as said file numbers.

8. The method of claim 6, wherein said determining comprises identifying file names from said volume files index, and searching the file status bits in said bitmaps for snapshots in which said file of interest is present.

9. The method of claim 8 further comprising setting said file status bit corresponding to a file to OFF in a bitmap if said file is absent from a corresponding snapshot, and setting the file status bit to ON if said file is present in said snapshot.

10. The method of claim 9, wherein said performing a file-level restore comprises returning a list of snapshots containing said file of interest, accessing said file of interest from a snapshot on said list, and restoring said accessed file of interest to a selected location.

11. Non-transitory computer readable medium storing executable instructions for a method of targeted file-level restore of one or more files of interest from snapshots of a storage volume of a processing system in a cloud that stores backup files, comprising:
    creating by said processing system a volume index identifying files in said storage volume;
    taking successive snapshots capturing the files in said storage volume at successive times;
    creating bitmaps for said snapshots, said bitmaps containing record numbers corresponding to file numbers identifying said files in said storage volume, and containing a file status bit for each record number indicating the presence or absence of a corresponding file in each said snapshot;
    determining whether a selected snapshot contains a file of interest for file-level restore based upon said file status bit of said file of interest in a bitmap of said selected snapshot; and
    performing a file-level restore of said file of interest from said selected snapshot.

12. The non-transitory computer readable medium of claim 11, wherein said creating said bitmaps comprises creating for each snapshot a data structure containing said record number and said file status bit for each file in said each snapshot, said status bit indicating the presence or absence of said each file in said each snapshot.

13. The non-transitory computer readable medium of claim 12, wherein said creating said bitmaps comprises updating the status of said each file in each successive snapshot by updating the file status bit for each said file in said bitmaps.

14. The method of claim 13, wherein said creating bitmaps comprises creating a file index for each snapshot, and said determining comprises comparing the file index with a volume files index of said storage volume, creating, based upon said comparing, a new snapshot file index with missing and new file record details, and creating said bitmap for said each snapshot using the new snapshot file index.

15. The non-transitory computer readable medium of claim 11 further comprising generating an initial volume files index of said storage volume comprising a list of files and a path of each file in said storage volume, and updating said list at said successive snapshots by appending new files to an end of said list.

16. The non-transitory computer readable medium of claim 15 further comprising obtaining file numbers of files in said storage volume from said list, and wherein said creating said bitmaps comprises identifying record numbers in said bitmaps as said file numbers.

17. The method of claim 16, wherein said determining comprises identifying file names from said volume files index, and searching the file status bits in said bitmaps for snapshots in which said file of interest is present.

18. The method of claim 17 further comprising setting said file status bit corresponding to a file to OFF in a bitmap if said file is absent from a corresponding snapshot, and setting the file status bit to ON if said file is present in said snapshot.

19. The method of claim 18, wherein said performing a file-level restore comprises returning a list of snapshots containing said file of interest, accessing said file of interest from a snapshot on said list, and restoring said accessed file of interest to a selected location.

\* \* \* \* \*